United States Patent Office 2,755,258
Patented July 17, 1956

2,755,258
TERTIARY AMINE OXIDES IN FOAM RUBBER

Robert J. Hay, Fall River, and Spencer M. Richardson, South Somerset, Mass., assignors to The Firestone Tire & Rubber Company, Akron, Ohio, a corporation of Ohio No Drawing. Application November 1, 1952, Serial No. 318,342

9 Claims. (Cl. 260—2.5)

This invention relates to the production of foam rubber by frothing a rubber latex and more particularly to the production of such a foam rubber having improved properties.

In the formation of so-called foamed rubber a rubber latex containing vulcanizing ingredients, desired compounding ingredients and a gelling agent is conventionally converted to a froth or foam by whipping or beating air into the latex. The frothed latex is then introduced into a mold of a desired shape or spread on a continuously moving flat surface and allowed to set to an irreversible gel. The gelled froth is then subjected to vulcanizing conditions to produce the desired article. The latex utilized may be natural rubber latex, or a so-called synthetic rubber latex, or it may be a mixture of a natural rubber latex and one or more synthetic rubber latices. Representative of the synthetic rubber latices is GR–S latex which is a latex produced by the emulsion polymerization of a major proportion of 1,3-butadiene and a minor proportion of styrene. Other synthetic rubber latices useful in producing foam rubber are those produced by the emulsion polymerization of 1,3-butadiene or the other conjugated dienes such as piperylene, dimethyl butadiene, isoprene, 2-chloro-1,3-butadiene and the like either alone or with each other and/or along with one or more polymerizable ethylene derivatives, e. g. acrylic nitriles such as acrylonitrile, methacrylonitrile, alphachloro acrylonitrile and the like; vinyl aromatic compounds such as vinyl naphthalene, vinyl toluene, divinyl benzene, various styrenes such as alphamethylstyrene, the nuclear substituted styrenes and the like; esters and amides of acrylic acids such as methyl acrylate, methyl methacrylate, acrylamide and other similar compounds. The gelling agent utilized is advantageously a delayed action gelling agent such as an alkali metal silico fluoride, ammonium nitrate, ammonium sulfate or the like.

A difficulty arising in the production of foam rubber is the tendency of the foam to collapse at gelation. Another difficulty is the tendency of the gelled froth to shrink. Still other difficulties arise from the sensitivity of the latex to zinc ions with resultant compound destabilization.

An object, therefore, of the invention is to provide a method of producing frothed rubber latices which do not collapse at gelation. Another object is to provide cured foam rubber having improved structure and properties. Another object is to provide an improved method of producing foam rubber gels having greatly reduced tendencies for shrinkage. A still further object is to provide improved methods of compounding a rubber latex for the production of foam rubber without adversely affecting the zinc oxide stability of the latex.

The above and further objects are produced in accordance with the invention by incorporating along with the usual vulcanizing ingredients a gelling agent and a relatively small proportion of a tertiary amine oxide into a rubber latex of the type broadly described above, frothing the latex, allowing the froth to set to an irreversible gel and thereafter subjecting the gelled froth to vulcanizing conditions.

The tertiary amine oxides useful in the practice of the invention are represented structurally by the following formula

wherein $R_1$, $R_2$ and $R_3$ are saturated aliphatic radicals or substituted saturated aliphatic radicals, or two together along with the nitrogen atom form a saturated heterocyclic ring. That is, all of the R groups can be substituted or unsubstituted saturated aliphatic radicals or one of the R groups can be a substituted or unsubstituted saturated aliphatic radical and the remaining two R groups can be joined together as a chain of alkylene groups. Examples of saturated aliphatic radicals are the methyl, ethyl, propyl, butyl, octyl, decyl, octadecyl, dodecyl and like radicals. Where two of the R groups jointly constitute a chain of alkylene groups, the useful compounds of the invention include those wherein the alkylene groups of the chain are interrupted by an oxygen atom as well as those wherein the alkylene groups are not so interrupted. Representative of the first type of compound are morpholine oxides; representative of the latter type of compound are piperidine oxides.

The amine oxides useful in practicing the invention are conveniently prepared by oxidizing a tertiary amine corresponding to the desired oxide.

Preferable amine oxides are those wherein at least one R group constitutes an alkyl chain containing at least four and preferably six or more carbon atoms and the other R groups are methyl groups or ethyl groups. However, as previously indicated, many tertiary amine oxides are useful in producing the desirable results of the invention. Illustrative amine oxides useful in the practice of the invention are:

Cetyl dimethyl amine oxide
Dioctadecyl methyl amine oxide
Di-n-butyl-(2-hydroxyethyl)-amine oxide
Methyl piperidine oxide
Dodecyl dimethyl amine oxide
Hexadecyl dimethyl amine oxide
Decyl dimethyl amine oxide
6-(cyclohexyl)-hexyl diethyl amine oxide
Tetradecyl dimethyl amine oxide
Octadecyl diethyl amine oxide
Octyl dimethyl amine oxide
Methyl dodecyl cetyl amine oxide
Methyl morpholine oxide
Dodecyl piperidine oxide
Methyl n-butyl cetyl amine oxide In the practice of the invention, a single tertiary amine oxide is incorporated into a latex, or mixtures of several different tertiary amine oxides are used.

A better understanding of the invention may be had by reference to the following examples included for the purpose of illustrating but not limiting the invention. Throughout the examples the weight of latex whether natural or synthetic is as expressed dry rubber weight.

Example 1

Concentrated natural rubber latex is compounded according to the following recipe:

| | Parts by weight |
|---|---|
| Latex (about 60% total solids) | 100.0 |
| Soap | 2.0 |
| Sulfur | 2.0 |
| Accelerator | 1.5 |
| Dimethyl dodecylamine oxide | 0.25 |

The above ingredients are mixed in accordance with conventional practice. Four parts by weight of zinc oxide and two parts by weight of sodium silicofluoride both based on the weight of rubber are then added to the latex; the latex is frothed by mechanical agitation and the froth is introduced into a suitable mold. The froth forms a stable gel in from 3 to 4 minutes and upon subjecting the gel to vulcanizing conditions an excellent foam rubber results having a fine continuous structure (essentially no loose ends).

A latex compound containing no amine oxide but otherwise identical with the above compound exhibits, under conditions identical to those used on the above compound, complete foam collapse at gelation.

Example 2

A blend of natural and synthetic rubber latices is compounded in accordance with the invention as follows:

|  | Parts by weight |
|---|---|
| Natural rubber latex (about 60% total solids) | 80.0 |
| GR-S latex (type V)[1] | 20.0 |
| Soap | 2.0 |
| Sulfur | 2.0 |
| Accelerator | 1.5 |
| Dimethyl dodecyl amine oxide | 0.25 |

[1] An aqueous emulsion copolymer latex of 75 parts by weight of butadiene and 25 parts by weight of styrene, the copolymer latex having a total solids content of approximately 50 percent.

The preparation of the above compound, the addition of zinc oxide and gelling agent, the frothing of the compound and the gelling and vulcanizing of the resulting froth are carried out in the same manner utilized in Example 1. At gelation an excellent firm gel results. Upon curing, an excellent foam rubber having a fine continuous structure results.

Here too, without the amine oxide, complete foam collapse results at gelation.

Example 3

As another illustration of the invention, a latex compound is prepared which is identical to that of Example 1 except for the amount of the amine oxide. In this example 0.50 part by weight of dimethyl dodecyl amine oxide is used. The zinc oxide and silicofluoride addition, the frothing, gelling and curing of the compound are the same as Example 1. The foam is firm and stable at gelation and the resulting cured foam rubber has a fine continuous structure.

Example 4

Another foam rubber is prepared in accordance with the invention by following the same procedure and using the same recipe used in Example 1 except for utilization of a different amine oxide. In this case 0.25 part by weight of dimethyl cetyl amine oxide is used. The resulting foam is firm and stable at gelation and the cured foam rubber has a fine continuous structure.

Example 5

Still another foam rubber in accordance with the invention is produced by varying the procedure and recipe used in Example 1 only in the use of a different amine oxide, i. e. 0.25 part by weight of dimethyl octadecyl amine oxide. The resulting foam is firm and stable at gelation and the resulting cured foam rubber has a fine continuous structure.

Example 6

Another foam rubber in accordance with the invention is produced by varying the conditions and recipe of Example 2 only in the use of a different amine oxide, i. e., 0.25 part by weight of dimethyl cetyl amine oxide. The resulting foam is stable and firm at gelation and the resulting cured foam rubber has a fine continuous structure.

Example 7

Another foam rubber in accordance with the invention is produced by preparing a latex compound having the same formula as that used in Example 2 except for the amine oxide. In this instance 0.25 part by weight of dimethyl octadecyl amine oxide is used. The mixing of the compound, the addition of zinc oxide and gelling agent, the frothing, gelling and curing of the compound are the same as Example 2. The resulting foam rubber has a uniform fine continuous structure.

Example 8

Another foam rubber in accordance with the invention is produced by varying the latex compound and procedure of Example 2 only in the quantity of amine oxide used, i. e., 0.50 part by weight. The foam resulting from the use of this material is stable at gelation and the cured foam rubber has a fine continuous structure.

Example 9

Another foam rubber in accordance with the invention is produced by the same procedure used in Example 6 and by varying the formula of Example 6 only in the quantity of amine oxide used, i. e., 0.5 part. The foam is firm at gelation and the cured foam has a fine continuous structure.

Example 10

Another foam rubber in accordance with the invention is produced by the same procedure used in Example 7 and by varying the formula of Example 7 only in the quantity of amine oxide used, i. e. 0.5 part. The foam is firm at gelation and the cured foam rubber has a fine continuous structure.

Example 11

Another foam rubber in accordance with the invention is produced by the same procedure used in Example 4 and by varying the formula of Example 4 only in the quantity of amine oxide used, i. e., 0.5 part. The foam is firm and stable at gelation and the resulting cured foam rubber has a fine continuous structure.

Example 12

Another foam rubber in accordance with the invention is produced by the same procedure used in Example 5 and varying from the formula of Example 5 only in the quantity of amine oxide used, i. e., 0.5 part. The resulting cured foam rubber has a fine continuous structure.

It is apparent by reference to the above examples that relatively small quantities of a great variety of tertiary amine oxides are effective in the practice of the invention. While the amount of amine oxide utilized in the examples has varied from 0.25 part by weight to 0.50 part by weight per 100 parts by weight of the rubber latex expressed as dry rubber weight, even smaller quantities of amine oxides are also effective in producing the results of the invention. The maximum amounts of amine oxides usable in the practice of the invention are also not particularly defined and may vary considerably depending on variation in the properties characteristic of a particular latex as well as variations in compounding and processing practice. Experience indicates that amounts of the amine oxides in excess of about 5 parts by weight per 100 parts of latex expressed as dry rubber content will ordinarily not be required.

The amine oxides of the invention are particularly useful in producing desirable foam rubbers from blended natural rubber and synthetic rubber (synthetic conjugated diene polymer rubber) latices wherein the natural rubber constitutes a major proportion of the blend. The amine oxides, however, are also useful in producing the results of the invention in blended latices wherein a synthetic rubber constitutes a major proportion of the blend. Demonstrable improvement is even obtained by the use of amine oxides in the production of foam rubber from 100% synthetic rubber latices.

Compounding of latices (except for the use of tertiary amine oxide) for practicing the invention is conventional. Vulcanizing ingredients include the usual vulcanizing agents (ordinarily sulfur); the usual accelerators such as zinc salts of mercaptobenzothiazole, benzothiazole disulfide, zinc diethyldithiocarbamate, piperdinium pentamethylene dithiocarbamate, tetramethylthiuram disulfide and the like; and the usual activators such as zinc oxide or other chemicals capable of producing zinc ions in solution. Conventional antioxidants and other usual compounding materials may be used if desired.

We claim:

1. A method of producing foam rubber having a particularly fine continuous structure which comprises incorporating a soap, vulcanizing ingredients including zinc oxide, a latex gelling agent selected from the group consisting of alkali metal silicofluorides, ammonium nitrate and ammonium sulfate, and a relatively small amount of dimethyl dodecyl amine oxide into a rubber latex, frothing the latex, allowing the frothed latex to set to an irreversible gel and thereafter vulcanizing the gelled froth.

2. A method of producing foam rubber having a particularly fine continuous structure which comprises incorporating a soap, vulcanizing ingredients including zinc oxide, latex gelling agent selected from the group consisting of alkali metal silicofluorides, ammonium nitrate and ammonium sulfate, and a relatively small amount of dimethyl cetyl amine oxide into a rubber latex, frothing the latex, allowing the frothed latex to set to an irreversible gel and thereafter vulcanizing the gelled froth.

3. A method of producing foam rubber having a particularly fine continuous structure which comprises incorporating a soap, vulcanizing ingredients including zinc oxide, a latex gelling agent selected from the group consisting of alkali metal silicofluorides, ammonium nitrate and ammonium sulfate, and a relatively small amount of dimethyl octadecyl amine oxide into a rubber latex, frothing the latex, allowing the frothed latex to set to an irreversible gel and thereafter vulcanizing the gelled froth.

4. A method of producing foam rubber having a fine continuous structure which comprises incorporating into a rubber latex a soap, vulcanizing ingredients including zinc oxide, a latex gelling agent selected from the group consisting of alkali metal silicofluorides, ammonium nitrate and ammmonium sulfate, and a realtively small amount of a tertiary amine oxide having the formula

wherein $R_1$, $R_2$ and $R_3$ are selected from the group of radicals consisting of (1) alkyl and cycloalkyl- and hydroxy-substituted alkyl radicals, (2) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of alkylene groups and (3) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of oxygen interrupted alkylene groups, frothing said latex, allowing the frothed latex to set to an irreversible gel and thereafter vulcanizing the gelled froth.

5. A method of producing foam rubber having a particularly fine continuous structure from a rubber latex containing a synthetic rubbery diene polymer, which comprises incorporating into said latex a soap, vulcanizing ingredients including zinc oxide, a latex gelling agent selected from the group consisting of alkali metal silicofluorides, ammonium nitrate and ammonium sulfate, and a relatively small amount of a tertiary amine oxide having the formula

wherein $R_1$, $R_2$ and $R_3$ are selected from the group of radicals consisting of (1) alkyl and cycloalkyl- and hydroxy-substituted alkyl radicals, (2) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of alkylene groups and (3) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of oxygen interrupted alkylene groups, frothing said latex, allowing the frothed latex to set to an irreversible gel and thereafter vulcanizing the gelled froth.

6. An irreversible gelled rubber latex froth containing a synthetic rubbery polymer of a conjugated diene, a soap, vulcanizing ingredients including zinc oxide, a latex gelling agent selected from the group consisting of alkali metal silicofluorides, ammonium nitrate and ammonium sulfate and a relatively small amount of a tertiary amine oxide having the formula

wherein $R_1$, $R_2$ and $R_3$ are selected from the group of radicals consisting of (1) alkyl and cycloalkyl- and hydroxy-substituted alkyl radicals, (2) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of alkylene groups and (3) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of oxygen interrupted alkylene groups.

7. A method of producing foam rubber having a particularly fine continuous structure from a latex mixture containing natural rubber and synthetic conjugated diene polymer rubber, which comprises incorporating into said latex mixture a soap, vulcanizing ingredients including zinc oxide, a latex gelling agent selected from the group consisting of alkali metal silicofluorides, ammonium nitrate and ammonium sulfate, and a relatively small amount of a tertiary amine oxide having the formula

wherein $R_1$, $R_2$ and $R_3$ are selected from the group of radicals consisting of (1) alkyl and cycloalkyl- and hydroxy-substituted alkyl radicals, (2) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of alkylene groups and (3) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of oxygen interrupted alkylene groups, frothing said latex, allowing the frothed latex to set to an irreversible gel and thereafter vulcanizing the gelled froth.

8. A method of producing foam rubber having a fine continuous structure which comprises incorporating into a natural rubber latex a soap, vulcanizing ingredients including zinc oxide, a latex gelling agent selected from the group consisting of alkali metal silicofluorides, ammonium nitrate and ammonium sulfate, and a relatively small amount of a tertiary amine oxide having the formula

wherein $R_1$, $R_2$ and $R_3$ are selected from the group of radicals consisting of (1) alkyl and cycloalkyl- and hydroxy-substituted alkyl radicals, (2) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of alkylene groups and (3) one of said $R_1$, $R_2$ and $R_3$ is selected from the group consisting of alkyl and cycloalkyl- and hydroxy-substituted alkyl radicals and the remaining two of said $R_1$, $R_2$ and $R_3$ are joined together as a chain of oxygen interrupted alkylene groups, frothing said latex, allowing the frothed latex to set to an irreversible gel and thereafter vulcanizing the gelled froth.

9. A method of producing foam rubber having a particularly fine continuous structure which comprises incorporating a soap, vulcanizing ingredients including zinc oxide, a latex gelling agent selected from the group consisting of alkali metal silicofluorides, ammonium nitrate and ammonium sulfate, and a relatively small amount of a trialkyl amine oxide into a rubber latex, frothing the latex, allowing the frothed latex to set to an irreversible gel and thereafter vulcanizing the gelled froth, at least one of the alkyl groups of the trialkyl amine oxide containing a chain of at least four carbon atoms.

References Cited in the file of this patent

UNITED STATES PATENTS

| | | |
|---|---|---|
| 2,261,439 | Kelly | Nov. 4, 1941 |
| 2,321,111 | Stamberger | June 8, 1943 |
| 2,446,429 | Nelson et al. | Aug. 3, 1948 |
| 2,512,697 | Te Grotenhuis | June 27, 1950 |
| 2,567,988 | Bethe | Sept. 18, 1951 |
| 2,661,340 | Van Veersen | Dec. 1, 1953 |

OTHER REFERENCES

Surface Active Agents, Schwartz-Perry, 1949, pages 198–199, and 509.